United States Patent
Kida et al.

(10) Patent No.: US 7,073,899 B2
(45) Date of Patent: Jul. 11, 2006

(54) INK JET RECORDING METHOD

(75) Inventors: Shuji Kida, Iruma (JP); Tomomi Yoshizawa, Hachioji (JP); Shinichi Suzuki, Saitama (JP); Hidenobu Ohya, Hachioji (JP)

(73) Assignee: Konica Corporation, Tokyo (JP)

( * ) Notice: Subject to any disclaimer, the term of this patent is extended or adjusted under 35 U.S.C. 154(b) by 474 days.

(21) Appl. No.: 10/447,543

(22) Filed: May 28, 2003

(65) Prior Publication Data

US 2004/0004652 A1 Jan. 8, 2004

(30) Foreign Application Priority Data

Jun. 5, 2002 (JP) .................... JP2002-164166

(51) Int. Cl.
*B41J 2/01* (2006.01)

(52) U.S. Cl. .............. 347/100; 347/101; 347/105
(58) Field of Classification Search ............. 347/100, 347/101, 105, 95, 96; 106/31.27, 31.13
See application file for complete search history.

(56) References Cited

U.S. PATENT DOCUMENTS

| 3,214,463 | A | * | 10/1965 | Schoenthaler et al. ......... 562/53 |
| 5,098,477 | A | * | 3/1992 | Vieira et al. .............. 106/31.27 |
| 5,554,759 | A | * | 9/1996 | Vishwakarma .............. 548/260 |
| 5,824,716 | A | * | 10/1998 | Coqueret et al. ............. 522/31 |
| 6,093,529 | A | * | 7/2000 | Tsuzuki et al. ............. 430/619 |
| 6,548,649 | B1 | * | 4/2003 | Mikoshiba et al. ...... 106/31.48 |
| 6,572,228 | B1 | * | 6/2003 | Kaga et al. ................. 347/106 |
| 6,699,536 | B1 | * | 3/2004 | Katoh et al. ............. 428/32.28 |

FOREIGN PATENT DOCUMENTS

JP         03160068 A   *  7/1991

* cited by examiner

*Primary Examiner*—Manish Shah
(74) *Attorney, Agent, or Firm*—Frishauf, Holtz, Goodman & Chick, P.C.

(57) ABSTRACT

An ink jet recording method including a step of: jetting a dye ink onto a surface of a recording medium, wherein said dye ink includes a latex capable of absorbing ultraviolet light, and said recording medium includes a substrate having thereon at least one ink absorbing layer, the outermost ink absorbing layer being a porous layer.

13 Claims, No Drawings

INK JET RECORDING METHOD

FIELD OF THE INVENTION

The present invention relates to an ink jet recording method using dye ink, and specifically, to an ink jet recording method which is superior in ink absorbability and exhibits favorable harmful gas resistance (oxidizing gas resistance) and light stability.

BACKGROUND OF THE INVENTION

Ink-jet recording is performed to record images and letters by ejection of minute ink droplets employing various working principles onto a recording sheet, such as paper, exhibiting advantages of relatively high speed, low noise and simple multi-color printing.

Recently, ink-jet printers have been developed of enhancement in image quality which approaches that of conventional silver halide photography, and thus, it is desired that a recording sheet also duplicates conventional photographic quality, and in addition reproduces the aesthetic property of silver halide photography (such as glossiness, smoothness and stiffness).

As one of the methods to reproduce said aesthetic properties of silver halide photography, a so-called swelling type recording sheet has become common, comprised of a hydrophilic binder such as gelatin and polyvinyl alcohol, applied onto a substrate. However, this method has drawbacks of low ink absorption rate, tendency of a sticky surface after printing, and image bleeding due to ambient humidity during storage. Specifically, ink droplets blend easily before they are absorbed due to low ink absorption rates, resulting in bleeding among different colors and beading or unevenness in the same color. Thus, achievement of the desired silver halide photographic image quality has not yet been realized to meet expectation.

So-called porous type recording sheets are becoming the main types instead of previous swelling types. A high ink absorption rate is a major feature due to effective ink absorption into minute voids.

Specifically, high glossiness and superior ink absorbability can be achieved by the combination of water soluble dye ink and a porous type ink jet recording medium, resulting in approaching the photographic image level, with regard to image quality.

On the other hand, storage stability of ink jet images is often compared with that of silver halide photography as image quality of ink jet images is improved. Specifically, regarding water soluble dye ink, pointed out is deterioration of ink jet images such as that accompanying transmission of coloring materials causing poor water fastness and bleeding of images, and chemical reaction of coloring materials causing inferior light stability and low oxidizing gas resistance.

As mentioned above, a number of studies have been made to achieve image quality comparable to silver halide photographic levels. As examples of light stability improvement, many techniques are disclosed, such as JP-A Nos. 57-74192, 57-87989, 57-74193, 58-152072, 64-36479, 1-95091, 1-115677, 3-13376, 4-7189, 7-195824, 8-25796, 11-321090, 11-277893, and 2000-37951 (the term JP-A means Japanese Patent Application Publication).

Regarding porous type recording sheets, they tend to cause problems such as discoloration in the presence of specific gases, specifically color-fading by so-called oxidizing gases, due to their porous structure in addition to other light stability drawbacks. Specifically, phthalocyanine series water-based dyes employed in common color ink jet printers tend to result in such discoloration.

The mechanism of this discoloration property is not yet fully clarified, but it is assumed that the minute porous structure has an excessively large surface area and the inorganic particles used therein have reactive surfaces, resulting in decomposition of dyes by minute quantities of reactive gases such as ozone, oxidants, SOx and NOx in the ambient air.

Techniques to minimize such discoloration problems are disclosed, for example, in JP-A Nos. 63-252780, 64-11877, 1-108083, 1-216881, 1-218882, 1-258980, 2-188287, 7-237348, 7-266689, and 8-164664. These discoloration problems are more prominent deteriorating problems in recording sheets exhibiting photograph image quality having an enhanced minute porous structure, and thus, the relevant art for improvement has not been sufficient to obtain the desired effects, calling for further fundamental improvement.

One of the measures to counter the foregoing problems is to use a swelling type recording sheet, but on the other hand, it is very difficult to improve the critical matter of slow ink absorption rate by the use of this type of recording sheets. Alternatively, for example, a gas insulating method which uses a laminating process for prints and framed printed photos, and a gas insulating layer developing method have been very effective, but in both cases after-treatment is necessary and this extra process is an additional production burden troublesome. The gas insulating layer developing method provides a gas insulating layer using a heat or pressure treatment after printing on the recording sheet, which contains thermoplastic particles in the surface layer, and is disclosed in JP-A Nos. 53-27426, 59-222381, 62-271781, 11-157207, 11-245507, and 2000-71608.

SUMMARY OF THE INVENTION

From the viewpoint of the foregoing, the present invention has been achieved. An object of the present invention is to provide an ink jet recording method which exhibits superior ink absorbability and excellent harmful gas resistance (oxidizing gas resistance) and light stability.

The foregoing object of the present invention was achieved employing the embodiments below.

1. An ink jet recording method comprising a step of: jetting a dye ink onto a surface of a recording medium, wherein said dye ink comprises a latex capable of absorbing ultraviolet light, and said recording medium comprises a substrate having thereon at least one ink absorbing layer, the outermost ink absorbing layer being a porous layer.

2. The ink jet recording method of embodiment 1 above, wherein said latex has a group of a benzotriazole derivative or a benzophenone derivative.

3. The ink jet recording method of embodiment 2 above, wherein said group of a benzotriazole derivative is represented by Formula (1):

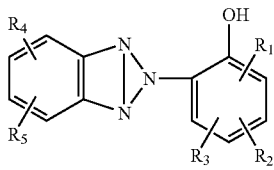

Formula (1)

wherein $R_1$, $R_2$, $R_3$, $R_4$ and $R_5$, which may be the same or different, each represents a halogen atom, a nitro group, a hydroxyl group, an alkyl group, an alkenyl group, an aryl group, an alkoxyl group, an acyloxy group, an aryloxy group, an alkylthio group, an arylthio group, a mono- or dialkylamino group, an acylamino group, or a 5- or 6-membered heterocyclic group, and $R_4$ and $R_5$ may combine to form a 5- or 6-membered carbocycle.

4. The ink jet recording method of embodiment 2 above, wherein said group of a benzophenone derivative is represented by Formula (2):

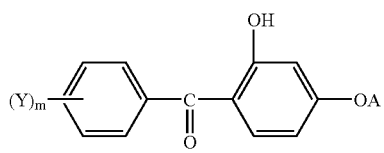

Formula (2)

wherein Y represents a halogen atom, an alkyl group, an alkenyl group, an alkoxyl group, or a phenyl group, provided that said alkyl group, said alkenyl group and said phenyl group may have a substituent; A represents a hydrogen atom, an alkyl group, an alkenyl group, a phenyl group, a cycloalkyl group, an alkylcarbonyl group, an alkylsulfonyl group, or —CO(NH)n-1-D; D represents an alkyl group, an alkenyl group, or a phenyl group which may have a substituent; m and n each represents 1 or 2.

5. The ink jet recording method of embodiment 1 above, wherein MFT (minimum film forming temperature) of said latex capable of absorbing ultraviolet light is 0–40° C.

6. The ink jet recording method of any of embodiment 1 above, wherein the average grain size of said latex capable of absorbing ultraviolet light is at most 150 nm.

7. The ink jet recording method of embodiment 1 above, wherein a content ratio of said latex is 1.0–10 weight % of the total weight of the dye ink.

8. The ink jet recording method of embodiment 1 above, wherein said dye ink contains an anti-fading agent.

9. The ink jet recording method of embodiment 1 above, wherein said substrate of said recording medium is a non-absorbent material.

10. The ink jet recording method of embodiment 1 above, wherein an ink absorbing layer featuring a porous structure contains fine silica particles.

11. The ink jet recording method of embodiment 1 above, wherein an ink absorbing layer featuring a porous structure contains a cationic polymer.

12. The ink jet recording method of embodiment 1 above, wherein an ink absorbing layer featuring a porous structure contains polyvinyl alcohol.

13. The ink jet recording method of embodiment 1 above, wherein an ink absorbing layer featuring a porous structure contains an anti-fading agent.

DESCRIPTION OF PREFERRED EMBODIMENTS

The inventors of the present invention endeavored to develop an ink jet recording method which exhibits superior ink absorbability and excellent harmful gas resistance (oxidizing gas resistance) and light stability by using a dye ink for image recording onto a recording medium, wherein a) a dye ink contains a latex having ultraviolet absorption capability; and b) an ink jet recording medium having at least one ink absorbing layer, the outermost layer of which is an ink absorbing layer featuring a porous structure. Finally, the inventors' efforts realized the present invention.

Generally, in ink using dyes as coloring materials, image storage stability is one of the major problems, as mentioned above. Specifically, in cases when a porous type ink jet recording medium (hereinafter, referred to merely as a recording medium) which exhibits good ink absorbability is used, image storage stability definitely exhibits oxidizing gas resistance but light stability is extremely deteriorated. The reason for this is that ink jet images are formed in a layer featuring a porous structure, resulting in coloring materials always being exposed to ambient gases. Thus, discoloration of prints on such recording media is excessive compared to other recording media.

Regarding the foregoing problems, as a discoloration prevention method of printed images obtained with dye ink and a porous type recording medium, a method exists which blocks harmful gases by covering the image surface with resins after image formation. However, in cases where a gas-barrier layer is provided on the image surface before printing, a problem of lowered ink absorbability during printing results.

To overcome this problem, the inventors previously found and proposed a method in which latex forms a gas-barrier layer by film formation on the recording medium, in which images were recorded on a porous type recording medium using dye ink containing latex.

As a result of further study, it was proved that discoloration by harmful gases was reduced, but desired effects of discoloration by light, which they label light stability, was negligible even after a gas-barrier layer was provided with the foregoing method, resulting in a continuing problem of inferiority in comparison to silver halide photography images.

The inventors have diligently studied methods not only to prevent discoloration by harmful gases but also to simultaneously improve light stability. As a result, the inventors developed and present this invention which could prevent discoloration by harmful gases, and at the same time improve light stability by incorporating a latex capable of absorbing ultraviolet light, enhancing the ultraviolet blocking effect with a gas-barrier of latex layer. Further, as outlined in embodiments of this invention, by incorporating anti-fading agents (specifically anti-oxidizing agents) in dye ink or recording mediums, decomposition of coloring materials by oxidation is minimized and light stability is enhanced.

The present invention will now be detailed.

In this invention, an ink jet recording method comprising a step of:

jetting a dye ink onto a surface of a recording medium, wherein said dye ink comprises a latex capable of absorbing ultraviolet light, and said recording medium comprises a substrate having thereon at least one ink absorbing layer, the outermost ink absorbing layer being a porous layer.

Firstly, the dye ink of this invention will be described.

One of the features is that the dye ink related to this invention incorporates latex capable of absorbing ultraviolet light.

The term of latex means resin particles added to ink, and also refers to polymer particles dispersed in a medium such as water.

The foregoing latex is employed in a form of dispersed elements in water. Specific examples contain series of polymers such as acrylic, styrene-acrylic, acrylonitrile-acrylic, vinyl acetate, vinyl acetate-acrylic, vinyl acetate-vinyl chloride, polyurethane, silicon-acrylic, acrylic silicon, polyester, and epoxy.

Usually these latexes are produced by an emulsion polymerization method. Surface active agents and polymerization initiators used here may be employed from commonly known ones. Synthetic methods of latexes are described in detail in U.S. Pat. Nos. 2,852,368, 2,853,457, 3,411,911, 3,411,911 and 4,197,127, Belgian Patent Nos. 688,882, 691,360 and 712,823, JP-B 45-5331 (the term JP-B means examined Japanese Patent Publication), and JP-A Nos. 60-18540, 51-130217, 58-137831 and 55-50240.

In this invention, latex capable of absorbing ultraviolet light preferably contains a group of a benzotriazole derivative or a benzophenone derivative. Further, the benzotriazole derivative is preferably represented by foregoing Formula (I).

Compounds having a benzotriazole derivative represented by Formula (I) will be described in the following.

In foregoing Formula (I), $R_1$, $R_2$, $R_3$, $R_4$ and $R_5$, which may be the same or different, each represents a halogen atom (chlorine, bromine, iodine or fluorine atom), a nitro group, a hydroxyl group, an alkyl group, an alkenyl group, an aryl group, an alkoxyl group (such as methyl, ethyl, n-propyl, iso-propyl, aminopropyl, n-butyl, sec-butyl, tert-butyl, chlorobutyl, n-amyl, iso-amyl, hexyl, octyl, nonyl, stearylamidebutyl, decyl, dodecyl, pentadecyl, hexadecyl, cyclohexyl, benzyl, phenylethyl, and phenylpropyl), an alkenyl group (such as vinyl, allyl, metaallyl, dodecenyl, tridecenyl, tetradecenyl, and octadecenyl), an aryl group (such as phenyl, 4-methylphenyl, 4-ethoxyphenyl, 2-hexoxyphenyl, and 3-hexoxyphenyl), an alkoxyl group (such as methoxy, ethoxy, propoxy, butoxy, chlorobutoxy, decoxy, diaminophenoxy, ethoxy, pentadecoxy, and octadecoxy), an oxycarbonyl group (such as carbomethoxy, carbobutoxy, carbohexoxy, and carbopentadecoxy), an aryloxy group (such as phenoxy, 4-methylphenoxy, 2-propylphenoxy, and 3-amilphenoxy), an alkylthio group (such as methylthio, ethylthio, t-butylthio, t-octylthio, and benzylthio), an arylthio group (such as phenylthio, methylphenylthio, ethylphenylthio, methoxyphenylthio, ethoxyphenylthio, and naphthylthio), mono- or dialkylamino group (such as N-ethylamino, N-t-octylamino, N,N-diethylamino, and N,N-di-t-butylamino), an acylamino group (such as acetylamino, benzoylamino, and methanesulfonylamino), 5- or 6-membered heterocycle residue containing an oxygen atom or a nitrogen atom (such as heterocycle residue of piperidino, morpholino, pyrrolidino, and piperazino), and $R_4$ may form a 5- or 6-membered ring with $R_5$ comprised of carbon atoms.

In Formula (I), the substituents represented by $R_1$–$R_5$ preferably have 5–36 carbon atoms, and in cases when they are alkyl groups, it is preferable for them to have 1–18 carbon atoms.

Examples of the compounds represented by Formula (1) are listed below, but the present invention is not limited to these examples.

UV-1-1: 2-(2'-hydroxy-5'-t-butylphenyl)-benzotriazole

UV-1-2: 2-(2'-hydroxy-3',5'-di-t-butylphenyl)-benzotriazole

UV-1-3: 2-(2'-hydroxy-3'-t-butyl-5'-methylphenyl)-5-chlorobenzotriazole

UV-1-4: 2-(2'-hydroxy-3',5'-di-t-butylphenyl)-5-chlorobenzotriazole

UV-1-5: 2-(2'-hydroxy-5'-isooctylphenyl)-benzotriazole

UV-1-6: 2-(2'-hydroxy-5'-n-octylphenyl)-benzotriazole

UV-1-7: 2-(2'-hydroxy-3',5'-di-t-amilphenyl)-benzotriazole

UV-1-8: 2-(2'-hydroxy-5'-dodecylphenyl)-benzotriazole

UV-1-9: 2-(2'-hydroxy-5'-hexadecylphenyl)-benzotriazole

UV-1-10: 2-(2'-hydroxy-3'-t-amil-5'-benzophenyl)-benzotriazole

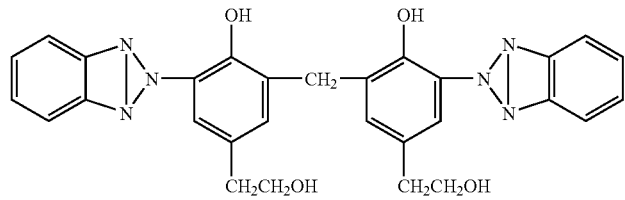

UV-1-11

-continued

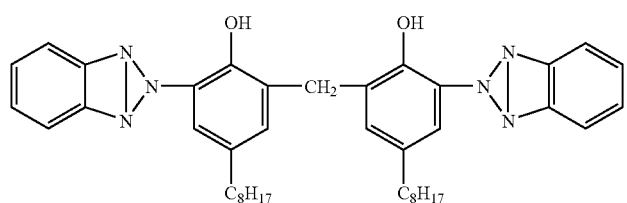
UV-1-12

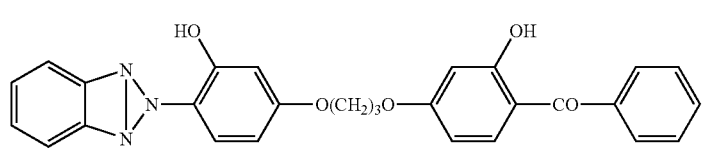
UV-1-13

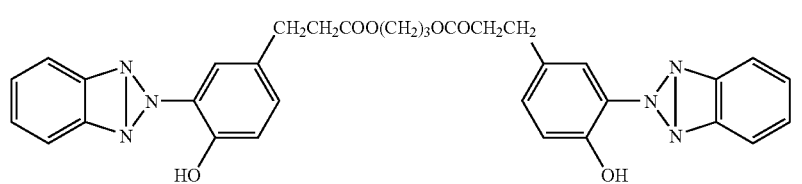
UV-1-14

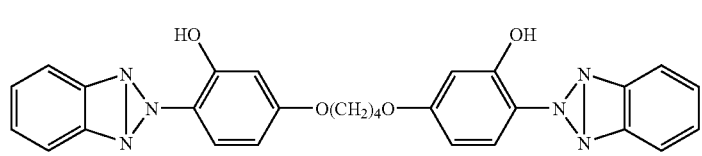
UV-1-15

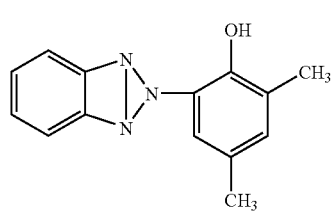
UV-1-16

Further, in this invention, the compounds represented by (IV-1) through (IV-39) described in JP-A 60-128434, pg. 10 through 12 may be employed. The foregoing benzotriazole type compounds used in this invention can easily be synthesized by the methods described in JP-B 44-29620, or similar methods.

In this invention, the benzophenone derivatives are preferably represented by foregoing Formula (2).

In foregoing Formula (2), Y represents a halogen atom or an alkyl group, an alkenyl group, an alkoxyl group and a phenyl group, and the alkyl group, alkenyl group and phenyl group may have a substituent. "A" represents a hydrogen atom, an alkyl group, an alkenyl group, a phenyl group, a cycloalkyl group, an alkylcarbonyl group, an alkylsulfonyl group, or a $-CO(NH)_{n-1}$-D group, while D represents an alkyl group, an alkenyl group, or a phenyl group which may contain a substituent. m and n each represents 1 or 2.

In the above, an alkyl group represents a straight chained or branched aliphatic group containing up to 24 carbon atoms, an alkoxyl group represents an alkoxyl group containing up to 18 carbon atoms, and an alkenyl group represents an alkenyl group containing up to 16 carbon atoms, such as an allyl group and a 2-butenyl group. Examples of substituents with an alkyl group, an alkenyl group and a phenyl group include a halogen atom such as chlorine, bromine, fluorine, a hydroxyl group, and a phenyl group (this phenyl group may be substituted with an alkyl group or a halogen atom).

Examples of benzophenone type compounds represented by Formula (2) are listed below, but the present invention is not limited to these examples.

UV-2-1: 2,4-dihydrokybenzophenone
UV-2-2: 2,2'-dihydroxy-4-methoxybenzophenone
UV-2-3: 2-hydroxy-4methoxy-5-sulfobenzophenone
UV-2-4: bis (2-methoxy-4-hydroxy-5-benzoylphenylmethane)

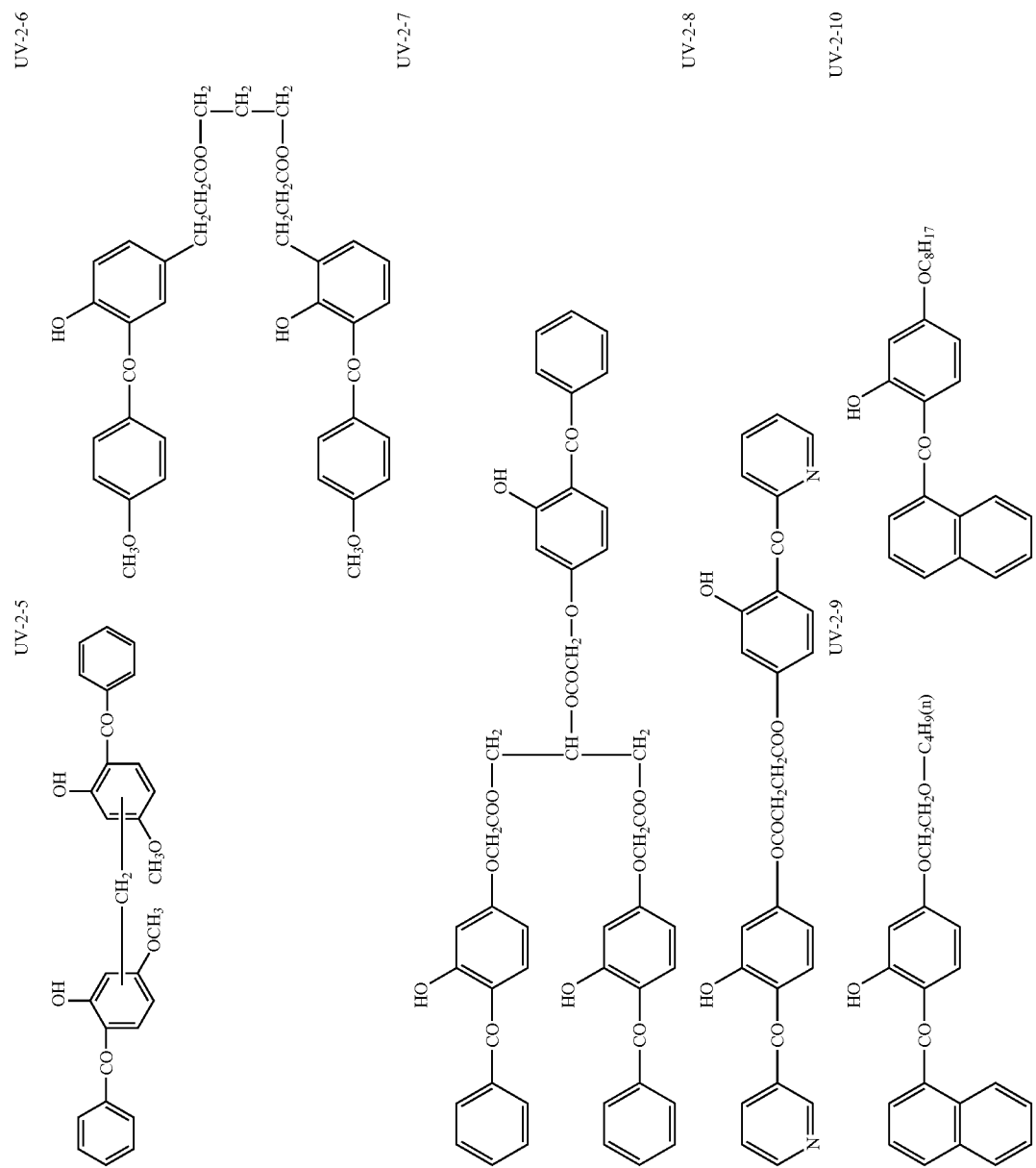

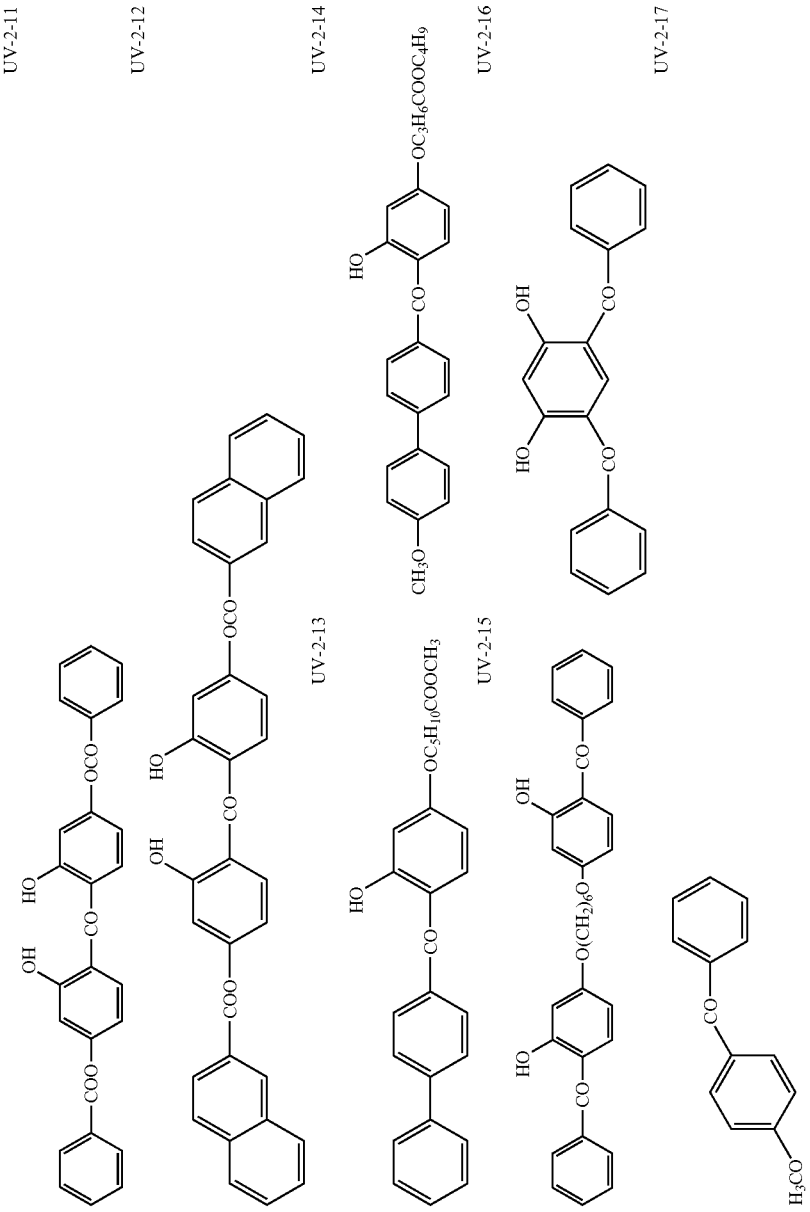

In this invention, the following methods are listed as addition methods of compounds having an ultraviolet absorption capability into latex, such as an ultraviolet absorbing agent which is dissolved into an organic solvent of alcohol, methylene chloride or dioxolane, and added during synthesis of latex, results in being incorporated into latex particles; an ultraviolet absorbing agent added to be incorporated into the side chain of latex structure during synthesis; or a copolymerization capable monomer containing a derivative represented by foregoing Formula (1) or Formula (2) of this invention is copolymerized with other monomers to provide an ultraviolet absorption function into a latex polymer.

The added amount of the foregoing compound capable of absorbing ultraviolet light depends on the kind of compound and the ultraviolet absorption capability, but is generally 10–100 weight % to latex, and preferably 30–70 weight %.

In this invention, the minimum film forming temperature (MFT) of latex capable of absorbing ultraviolet light is preferably 0–40° C. A film forming aide may be added to control the minimum film forming temperature of the latex. A film forming aide is often called a plasticizer, and an organic compound (usually an organic solvent) to lower the minimum film forming temperature of polymer latex, is described in "Gosei Latex no Kagaku" (Chemistry of Synthetic Latex) by Soichi Muroi, published by Kobunshi Kanko-Kai (1970).

In this invention, the average particle size of latex capable of absorbing ultraviolet light is preferably at most 150 nm, more preferably 10–150 nm, and still more preferably 10–100 nm.

The average size of latex particles is easily determined using a commercially available particle size measurement apparatus with a light scattering method or a laser doppler method, such as Zetasizer 1000 manufactured by Malvern Instruments Ltd.

In this invention, the content of latex capable of absorbing ultraviolet light in ink is preferably 1.0–10 weight %, and more preferably 1.0–5 weight %. In cases when the added amount of latex is more than 1.0 weight %, a sufficient effect to discoloration property can be obtained. When the amount is less than 10 weight %, ink ejectibility may be more stable, and further, an increase of ink viscosity during storage may be prevented, which is preferable.

In this invention, the dye ink preferably contains an anti-fading agent.

Examples of the acceptable anti-fading agents in dye ink of this invention include water soluble reducing agents, sulfur containing compounds, and emulsified dispersions of hydrophobic anti-oxidixing agents. The added amount of the anti-oxidizing agents to the ink is 0.1–10 weight %, and preferably 0.2–5 weight %.

Water soluble reducing agents are described in JP-A Nos. 8-300807, 8-150773, 8-108617 and 9-267544, and examples include sulfites, nitrites, phosphites, thiosulfates, ascorbic acid or their salts, hydroxylamine derivatives (N,N-diethylhydroxylamine, N,N-disulfoethylhydroxylamine-sodium salt, N-hydroxyphthalimide, and N,N-dicarboxyethylhydroxylamine.sodium salt), and glucose.

Sulfur containing compounds are described in JP-A Nos. 61-177279, 61-163886, 64-36479, 7-314883, 7-314882 and 1-115677, and examples include thiocyanates, thiourea, 2-mercaptobenzimidazole, 2-mercaptobenzothiazole, 2-mercaptobenzoxazole, 5-mercapto-1-methyltetrazole, 2,5-dimercapto-1,3,4-triazole, 2,4,6-trimercaptocyanuric acid, thiosalicylic acid, thiouracil, and 1,2-bis(2-hydroxyethylthio) ethane.

As hydrophobic anti-oxidizing agents, commonly used are known anti-oxidizing agents described in JP-A Nos. 57-74192, 57-87989, 1-115667 and 3-13376. Examples of specifically preferable anti-oxidizing agents include so-called hindered phenol type anti-oxidizing agents substituting at least one ortho position of the hydroxyl group with a tertiary alkyl group, piperidine type anti-oxidizing agents (so-called hindered amines) two of which carbon atoms linked to a nitrogen atom are both substituted by alkyl groups, and anti-oxidizing agents at least one hydroxyl group of phenols or polyhydroxybenzenes of which is etherified with an alkyl group.

The foregoing hydrophobic anti-oxidizing agents are preferably added to a hydrophilic binder in the form of an emulsified dispersion together with hydrophobic high boiling point organic solvents (di-2-ethylhexyl phthalate, di-i-decyl phthalate, tricresyl phosphate, and tri-2-ethylhexyl phosphate). In cases when these anti-oxidizing agents are added for dissolving in organic solvents such as acetone or methanol, or added with a wet grinding method, the long-acting effects of anti-fading are relatively small. The ratio of hydrophobic anti-oxidizing agents to high boiling organic solvents is generally 1:5–10:1 by weight.

Ink of this invention contains at least a water soluble dye, water and an organic solvent, in addition to the foregoing latex.

Water soluble dyes usable in this invention include, for example, such as azo dyes, methine dyes, azomethine dyes, xanethene dyes, quinone dyes, phthalocyanine dyes, triphenylmethane dyes and diphenylmethane dyes, concrete compounds are listed below. However, this invention is not limited to these exemplified compounds.

[C.I. Acid Yellow]
1, 3, 11, 17, 18, 19, 23, 25, 36, 38, 40, 42, 44, 49, 59, 61, 65, 67, 72, 73, 79, 99, 104, 110, 114, 116, 118, 121, 127, 129, 135, 137, 141, 143, 151, 155, 158, 159, 169, 176, 184, 193, 200, 204, 207, 215, 219, 220, 230, 232, 235, 241, 242, 246

[C.I. Acid Orange]
3, 7, 8, 10, 19, 24, 51, 56, 67, 74, 80, 86, 87, 88, 89, 94, 95, 107, 108, 116, 122, 127, 140, 142, 144, 149, 152, 156, 162, 166, 168

[C.I. Acid Red]
1, 6, 8, 9, 13, 18, 27, 35, 37, 52, 54, 57, 73, 82, 88, 97, 106, 111, 114, 118, 119, 127, 131, 138, 143, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, 415

[C.I. Acid Violet]
17, 19, 21, 42, 43, 47, 48, 49, 54, 66, 78, 90, 97, 102, 109, 126

[C.I. Acid Blue]
1, 7, 9, 15, 23, 25, 40, 62, 72, 74, 80, 83, 90, 92, 103, 104, 112, 113, 114, 120, 127, 128, 129, 138, 140, 142, 156, 158, 171, 182, 185, 193, 199, 201, 203, 204, 205, 207, 209, 220, 221, 224, 225, 229, 230, 239, 249, 258, 260, 264, 278, 279, 280, 284, 290, 296, 298, 300, 317, 324, 333, 335, 338, 342, 350

[C.I. Acid Green]
9, 12, 16, 19, 20, 25, 27, 28, 40, 43, 56, 73, 81, 84, 104, 108, 109

[C.I. Acid Brown]
2, 4, 13, 14, 19, 28, 44, 123, 224, 226, 227, 248, 282, 283, 289, 294, 297, 298, 301, 355, 357, 413

[C.I. Acid Black]
1, 2, 3, 24, 26, 31, 50, 52, 58, 60, 63, 107, 109, 112, 119, 132, 140, 155, 172, 187, 188, 194, 207, 222

[C.I. Direct Yellow]
8, 9, 10, 11, 12, 22, 27, 28, 39, 44, 50, 58, 86, 87, 98, 105, 106, 130, 132, 137, 142, 147, 153
[C.I. Direct Orange]
6, 26, 27, 34, 39, 40, 46, 102, 105, 107, 118
[C.I. Direct Red]
2, 4, 9, 23, 24, 31, 54, 62, 69, 79, 80, 81, 83, 84, 89, 95, 212, 224, 225, 226, 227, 239, 242, 243, 254
[C.I. Direct Violet]
9, 35, 51, 66, 94, 95
[C.I. Direct Blue]
1, 15, 71, 76, 77, 78, 80, 86, 87, 90, 98, 106, 108, 160, 168, 189, 192, 193, 199, 200, 201, 202, 203, 218, 225, 229, 237, 244, 248, 251, 270, 273, 274, 290, 291
[C.I. Direct Green]
26, 28, 59, 80, 85
[C.I. Direct Brown]
44, 106, 115, 195, 209, 210, 222, 223
[C.I. Direct Black]
17, 19, 22, 32, 51, 62, 108, 112, 113, 117, 118, 132, 146, 154, 159, 169
[C.I. Basic Yellow]
1, 2, 11, 13, 15, 19, 21, 28, 29, 32, 36, 40, 41, 45, 51, 63, 67, 70, 73, 91
[C.I. Basic Orange]
2, 21, 22
[C.I. Basic Red]
1, 2, 12, 13, 14, 15, 18, 23, 24, 27, 29, 35, 36, 39, 46, 51, 52, 69, 70, 73, 82, 109
[C.I. Basic Violet]
1, 3, 7, 10, 11, 15, 16, 21, 27, 39
[C.I. Basic Blue]
1, 3, 7, 9, 21, 22, 26, 41, 45, 47, 52, 54, 65, 69, 75, 77, 92, 100, 105, 117, 124, 129, 147, 151
[C.I. Basic Green]
1, 4
[C.I. Basic Brown]
1
[C.I. Reactive Yellow]
2, 3, 7, 15, 17, 18, 22, 23, 24, 25, 27, 37, 39, 42, 57, 69, 76, 81, 84, 85, 86, 87, 92, 95, 102, 105, 111, 125, 135, 136, 137, 142, 143, 145, 151, 160, 161, 165, 167, 168, 175, 176
[C.I. Reactive Orange]
1, 4, 5, 7, 11, 12, 13, 15, 16, 20, 30, 35, 56, 64, 67, 69, 70, 72, 74, 82, 84, 86, 87, 91, 92, 93, 95, 107
[C.I. Reactive Red]
2, 3, 5, 8, 11, 21, 22, 23, 24, 28, 29, 31, 33, 35, 43, 45, 49, 55, 56, 58, 65, 66, 78, 83, 84, 106, 111, 112, 113, 114, 116, 120, 123, 124, 128, 130, 136, 141, 147, 158, 159, 171, 174, 180, 183, 184, 187, 190, 193, 194, 195, 198, 218, 220, 222, 223, 228, 235
[C.I. Reactive Violet]
1, 2, 4, 5, 6, 22, 23, 33, 36, 38
[C.I. Reactive Blue]
2, 3, 4, 5, 7, 13, 14, 15, 19, 21, 25, 27, 28, 29, 38, 39, 41, 49, 50, 52, 63, 69, 71, 72, 77, 79, 89, 104, 109, 112, 113, 114, 116, 119, 120, 122, 137, 140, 143, 147, 160, 161, 162, 163, 168, 171, 176, 182, 184, 191, 194, 195, 198, 203, 204, 207, 209, 211, 214, 220, 221, 222, 231, 235, 236
[C.I. Reactive Green]
8, 12, 15, 19, 21
[C.I. Reactive Brown]
2, 7, 9, 10, 11, 17, 18, 19, 21, 23, 31, 37, 43, 46
[C.I. Reactive Black]
5, 8, 13, 14, 31, 34, 39
are listed, and the dyes listed above are described in such as "Dyeing Notebook 21$^{st}$ edition" (published by Shikisen-Sha).

Among these water-soluble dyes, preferable are phthalocyanine dyes. Phthalocyanine dyes include those which are unsubstituted or have a center element which is a metal or a non-metal, but preferably copper, and more preferably C.I. Direct Blue 199.

The organic solvent usable in this invention are not specifically limited, but water soluble organic solvents are preferable. Examples of the water-soluble solvents include an alcohol such as methanol, ethanol, propanol, isopropanol, butanol, isobutanol, secondary butanol, tertiary butanol, pentanol, hexanol, cyclohexanol and benzyl alcohol; a polyvalent-alcohol such as ethylene glycol, diethylene glycol, triethylene glycol, polyethylene glycol, propylene glycol, dipropylene glycol, polypropylene glycol, butylenes glycol, hexanediol, pentanediol, glycerine, hexanetriol and thiodiglycol; a polyvalent-alcohol ether such as ethylene glycol monomethyl ether, ethylene glycol monoethyl ether, ethylene glycol monobutyl ether, ethylene glycol monophenyl ether, diethylene glycol monomethyl ether, diethylene glycol monoethyl ether, diethylene glycol monobutyl ether, diethylene glycol dimethyl ether, propylene glycol monomethyl ether, propylene glycol monobutyl ether, ethylene glycol monomethyl ether acetate, triethylene glycol monomethyl ether, triethylene glycol monoethyl ether, triethylene glycol monobutyl ether, triethylene glycol dimethyl ether, dipropylene glycol monopropyl ether, tripropylene glycol dimethyl ether; an amine such as ethanolamine, diethanol amine, triethanolamine, N-methyldiethanol amine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine and tetramethylpropylenediamine; an amide such as formamide, N,N-dimethylformamide and N,N-dimethylacetoamide; a heterocyclic compound such as 2-pyrrolidone, N-methyl-2-pyrrolidone, N-cyclohexyl-2-pyrrolidone, 2-oxazolidone and 1,3-dimethyl-2-imidazolidinone; a sulfoxide such as dimethylsuofoxide; a sulfone such as sulfolane; a sulfonate such as 1-buthanesulfonate sodium salt; urea; acetonitrile and acetone.

Various surface active agents may be employed in ink of this invention. Usable surface active agents in this invention are not specifically limited, but examples include anionic surface active agents such as dialkylsulfosuccinates, alkylnaphthalenesulfonates, and fatty acid salts; nonionic surface active agents such as polyoxyethylenealkyl ethers, polyoxyethylenealkylallyl ethers, acetylene glycols, and polyoxyethylene-polyoxypropylene block copolymers; and cationic surface active agents such as alkylamine salts, and quaternary ammonium salts. Specifically, anionic and non-ionic surface active agents are preferably employed.

Further, polymer surface active agents may also employed in the ink of this invention. Examples include styrene-acrylic acid-alkyl acrylate copolymers, styrene-acrylic acid copolymers, styrene-maleic acid-alkyl acrylate copolymers, styrene-maleic acid copolymers, styrene-methacrylic acid-alkyl acrylate copolymers, styrene-methacrylic acid copolymers, styrene-maleic acid half-ester copolymers, vinylnaphthalene-acrylic acid copolymers, and vinylnaphthalene-maleic acid copolymers.

In addition to the foregoing compounds, various commonly known additives such as a viscosity controlling agent, a surface tension controlling agent, a specific resistance controlling agent, a layer forming agent, an anti-mold agent and a rust preventing agent may be added to the ink composition aimed at the objective of improving the properties of the ink such as ejection stability, suitability to the print head or cartridge, and storage stability, and the image stability and other properties. The additives, for example, include fine oil droplet particles such as liquid paraffin, dioctyl phthalate, tricresyl phosphate or silicone oil; also added may be fluorescent brightening agents described in JP-A Nos. 59-42993, 59-52689, 62-280069, 61-242871 and 4-219266.

Subsequently, the ink jet recording medium of this invention will be described.

In this invention, preferred is to use the ink-jet recording sheets in which the outermost layer has a porous structure. From production efficiency and cost points of view, the outermost layer preferably doubles as an ink absorbing layer, and more preferably has only one ink absorbing layer, doubling for the outermost layer in constituting the sheet. Generally, an ink absorbing layer is divided into a swelling type and a porous type, and ink absorbing layers except the outermost layer may be a porous type or a swelling type, or a combination of these two types.

The case of the preferable constitution of the outermost layer having a porous structure doubling as the ink absorbing layer is detailed below.

A porous type ink absorbing layer will be further detailed below.

The porous layer is formed primarily by weak coagulation of a water soluble binder and fine organic particles. Heretofore, various methods to form pores in film are known, of which for example, the following methods are applicable: a method in which a uniform coating liquid containing two or more kinds of polymer is coated on a substrate and the pores are formed by phase separation of the polymers in the course of drying of the coated layer; a method in which a coating liquid containing solid particles and a hydrophilic or hydrophobic binder is coated on a substrate and dried, and the thus dried ink-jet recording paper is immersed in water or a liquid containing suitable organic solvent to dissolve the solid particles to form the pores; a method in which a coating liquid containing a substance capable of foaming during layer formation is coated on a substrate and foam is formed from the substance in the course of drying to form the pores; a method in which a coating liquid containing fine porous particles and a hydrophilic binder is coated on a substrate to form the pores in or between the porous solid particles; and a method in which a coating liquid containing a hydrophilic binder and solid particles and/or fine oil droplets in an amount at least equal in volume of the hydrophilic binder is coated on the substrate to form pores between the solid particles. In this invention, it is specifically preferable that the pores are formed by a method of containing various inorganic fine solid particles having an average particle size of at most 150 nm in the porous layer.

Cited as examples of the inorganic fine particles used for the above purpose may be white inorganic pigments such as light precipitated calcium carbonate, heavy calcium carbonate, magnesium carbonate, kaolin, clay, talc, calcium sulfate, barium sulfate, titanium dioxide, zinc oxide, zinc hydroxide, zinc sulfide, zinc carbonate, hydrotalcite, aluminum silicate, diatomaceous earth, calcium silicate, magnesium silicate, silica, alumina, colloidal alumina, pseudo boehmite, aluminum hydroxide, lithopone, zeolite, and magnesium hydroxide.

The average diameter of the fine inorganic particles may be calculated as follows. The particles themselves, or the cross-section or surface of a porous layer, is observed employing an electron microscope, and each diameter of 1,000 randomly selected particles is determined. The simple average (the numerical average) is obtained as the diameter of the particles based on the determined diameter. Herein, each particle diameter is represented by the diameter of a circle having the same projection area as that of the particle.

Fine solid particles selected from silica, alumina and alumina hydrate are preferably used as fine inorganic particles.

In this invention, it is preferable that at least one ink absorbing layer featuring a porous structure contains fine silica particles.

Silica synthesized with a typical wet method, colloidal silica or silica synthesized with a gas phase method may be employed as usable silica in this invention, and further, specifically preferable is fine particle silica in this invention, colloidal silica and silica synthesized using a gas phase method. Of these, silica synthesized with a gas phase method is preferable not only for the high void ratio which can be obtained, also for hard formation of coarse aggregates when added to the later-mentioned cationic polymers used for fixing dyes. Alumina and alumina hydrate may be crystalline or amorphous, and optional shapes of undetermined form, spherical or needle-shaped may also be employed.

The fine inorganic particles in fine particle dispersed solution before mixing to cationic polymers are preferably dispersed in a primary particle state.

The particle size of fine inorganic particles is preferably not more than 100 nm. For example, in case of the foregoing silica synthesized via a gas phase method, the average particle size of primary particles of fine inorganic particles dispersed in a primary particle state (the particle size in the state of a dispersed solution before coating) is preferably at most 100 nm, more preferably 4–50 nm, and still more preferably 4–20 nm.

As the most preferably used silica synthesized via a gas phase method having an average particle size of primary particles of 4–20 nm, is Aerosil produced by Nippon Aerosil Co., Ltd. which is commercially available. This fine particle silica synthesized by a gas phase method is relatively easily dispersed into primary particles in water using Jet-stream Inductor Mixer manufactured by Mitamura Riken Kogyo Co., Ltd., employing suction dispersion.

Water soluble binders may be incorporated into the ink absorbing layer of the present invention. Listed as examples of the water soluble binders usable in this invention are: polyvinyl alcohol, gelatin, polyethylene oxide, polyvinylpyrrolidone, polyacrylic acid, polyacryl amide, polyurethane, dextran, dextrin, carageenan (κ, ι, λ), agar, pullulan, water soluble polyvinyl butyral, hydroxyethyl cellulose, and carboxymethyl cellulose. These water soluble binders may be used in combinations of more than two kinds.

In this invention, it is preferable that at least one ink absorbing layer, featuring a porous structure, contains polyvinyl alcohol.

Polyvinyl alcohols employed in the present invention include common polyvinyl alcohol prepared by hydrolyzing polyvinyl acetate, and in addition, modified polyvinyl alcohol such as terminal cation-modified polyvinyl alcohol and anion-modified polyvinyl alcohol having an anionic group.

The average degree of polymerization of polyvinyl alcohol prepared by hydrolyzing vinyl acetate is preferably 1,000 or more, and is more preferably 1,500–5,000. Further, the saponification ratio is preferably 70–100%, and is more preferably 80–99.5%.

Cation-modified polyvinyl alcohols are, for example, polyvinyl alcohols having a primary to a tertiary amino group, or a quaternary ammonium group on the main chain or side chain of the foregoing polyvinyl alcohols as described in JP-A 61-10483, and are obtained upon saponification of copolymers comprised of ethylenic unsaturated monomers having a cationic group or vinyl acetate.

Listed as ethylenic unsaturated monomers having a cationic group are, for example, trimethyl-(2-acrylamido-2,2-dimethylethyl) ammonium chloride, trimethyl-(3-acrylamido-3,3-dimethylpropyl) ammonium chloride, N-vinylimidazole, N-vinyl-2-methylimidazole, N-(3-dimethylaminopropyl) methacrylamide, hydroxylethyltrimethylammonium chloride, trimethyl-(2-methacrylamidopropyl) ammonium chloride, and N-(1,1-dimethyl-3-dimethylaminopropyl) acrylamide.

The content ratio of monomers containing a cation-modified group of the cation-modified polyvinyl alcohol is commonly 0.1–10 mol % to the vinyl acetate, and is preferably 0.2–5 mol %.

Listed as anion-modified polyvinyl alcohols are, for example, polyvinyl alcohols having an anionic group as described in JP-A 1-206088, copolymers of vinyl alcohols and vinyl compounds having a water solubilizing group as described in JP-A Nos. 61-237681 and 63-307979, and modified polyvinyl alcohols containing a water solubilizing group, as described in JP-A 7-285265.

Further, listed as nonion-modified polyvinyl alcohols are, for example, polyvinyl alcohol derivatives in which a polyalkylene oxide group is added to a part of polyvinyl alcohol as described in JP-A 7-9758, and block copolymers of vinyl compounds having a hydrophobic group and polyvinyl alcohols as described in JP-A 8-25795. Further, various types of polyvinyl alcohols, in which the degree of polymerization or modification differs, may be employed in a combination of at least two types.

The added amount of fine inorganic particles, employed in the ink absorbing layer, varies largely depending on the desired ink absorption capacity, the void ratio of the porous layer, the types of fine inorganic particles, and the types of water soluble binders, but is generally 5–30 g/m$^2$ of the recording sheet, and is preferably 10–25 g/m$^2$.

The ratio of fine inorganic particles to a water soluble binder, employed in the ink absorbing layer, is generally 2:1–20:1 by weight, and is preferably 3:1–10:1.

In this invention, it is preferable that at least one ink absorbing layer featuring a porous structure contains cationic polymers.

Cationic polymers used in this invention are not specifically limited, but include commonly known cationic polymers for ink jet recording sheets. Of these, it is preferred that the ink absorbing layer contains cationic polymers having a quaternary ammonium salt group. Examples of such include cationic polymers having a guanidil group as described in JP-A 57-64591, dimethyldiallylammonium chlorides described in JP-A 59-20696, polyaminesulfones described in JP-A 59-33176, alkyl(meta)acrylate quaternary ammonium salt type or alkyl(meta)acrylamide quaternary ammonium salt type cationic polymers described in JP-A 63-115780, copolymerized polymers of dimethylallylammonium chlorides and acrylamide described in JP-A Nos. 64-9776 and 64-75281, cationic polymers containing more than two quaternary nitrogen atoms in a repeating unit as described in JP-A 3-133686, polyvinyl pyrrolidone having a quaternary ammonium group described in JP-A 4-288283, cationic polymers obtained by reaction of a secondary amine and epihalohydrine described in JP-A Nos. 6-92010 and 6-234268, polystyrene type cationic polymers described in International Patent Application Publication No. WO 99/64248, cationic polymers comprised of repeating units having more than two types of cationic groups as described in JP-A 11-348409.

The content of the cationic polymers is usually 0.1–10 g/m$^2$ of an ink jet recording sheet, and preferably in the range of 0.2–5 g/m$^2$.

Further, in this invention, it is preferable that at least one ink absorbing layer featuring a porous structure contains an anti-fading agent. As anti-fading agents, listed are the same ones as the prior anti-fading agents used in the dye ink. The added amount of the anti-fading agent is 0.01 g–5 g per m$^2$ of the recording sheet, and preferably in the range of 0.1 g–2 g. The more the added amount, the more the anti-fading effect, but at the cost of lowering the void volume. Therefore, limits exist.

The total amount of pores (meaning void volume) in the porous layer is preferably at least 20 ml per m$^2$ of the recording sheet. In cases when the void volume is less than 20 ml/m$^2$, ink absorbability is adequate with only low ink volume at printing, but incomplete ink absorption at a high volume of ink tends to result in problems of lowered image quality or protracted ink drying.

In porous layers exhibiting ink retention ability, the void volume to the volume of solids is defined as the void ratio. It is preferred to maintain a void ratio of at least 50% in this invention, effectively forming pores without an unnecessarily thick layer.

It is preferred to use a hardening agent in this invention. The hardening agent may be added at any appropriate time during production of the ink-jet recording sheet, and can, for instance, be added into the coating composition to form an ink absorbing layer.

In this invention, a method to apply a hardening agent to a water soluble binder may employed by itself, but is preferably employed in combination with a method adding the foregoing hardening agent into the coating composition to form an ink absorbing layer.

Usable hardening agents of this invention are not limited as long as they cause a hardening reaction in a water soluble binder, and preferably used is boric acid and salts thereof, while in addition other commonly known compounds may also be used. Generally, hardening agents are compounds having a group capable of reacting with water soluble binder, or accelerating a reaction between different groups contained in the water soluble binder, and are appropriately used depending on the type of a water soluble binder. Examples of hardening agents are epoxy type hardening agents (e.g., diglycidyl ethyl ether, ethylene glycol diglycidyl ether, 1,4-butanediol diglycidyl ether, 1,6-diglycidylcyclohexane, N,N-diglycidyl-4-glycidyloxyaniline, sorbitol polyglycidyl ether, and glycerol polyglycidyl ether); aldehyde type hardening agents (e.g., formaldehyde and glyoxal); active halogen type hardening agents (e.g., 2,4-dichloro-4-hydroxy-1,3,5-s-trizine); and active vinyl type compounds (e.g., 1,3,5-trisacryloyl-hexahydro-s-triazine, and bisvinylsulfonyl methyl ether); and aluminum alum.

Boric acid and salts thereof refer to oxygen acid having a boron atom as the central atom and/or salts thereof, and specifically include orthoboric acid, diboric acid, metaboric acid, tetraboric acid, pentaboric acid, and octaboric acid, and salts thereof.

Hardening agents of boric acid and salts thereof having a boron atom may be used in the form of a solution thereof, by itself or in a mixture of two or more kinds. Specifically preferred is a mixed solution of boric acid and borax.

Generally only a boric acid solution and a borax solution are each added in relatively diluted solutions, but a denser solution can be obtained by mixing both solutions, resulting in a concentrated coating composition. Further, there is a benefit by adjusting the pH of the added solution to a specific level.

The total added amount of the foregoing hardening agents is preferably 1–600 mg/g of the foregoing water soluble binder.

Substrates usable in the present invention are common ones for an ink-jet recording sheet, which may be appropriately chosen from paper substrates such as standard paper, art paper, coated paper and cast-coated paper; plastic substrates; paper substrates coated on both sides with polyolefin; and complex substrates of pastes of these substrates. In the embodiment of this invention, employed substrates are preferably not-water absorptive. Because of a closer approach to a photographic image of the recorded image, and obtaining high image quality at lower cost, a non-water absorptive substrate is specifically preferable.

In this invention, plastic substrates or paper substrates coated on both sides with polyolefin in non-water absorptive substrates are specifically preferable because of their superior oxidizing gas resistance.

Raw paper substrates covered on both sides with polyolefin are described below.

The raw material used for such paper substrates is made of wood pulp as the principal raw material, and synthesized pulp of polypropylene and synthesized fibers of nylon or polyester may be added to the wood pulp based on function. As wood pulp, any of LBKP, LBSP, NBKP, NBSP, LDP, NDP, LUKP and NUKP may also be used. It is preferable that LBKP, NBSP, LBSP, NDP and LDP, each containing mostly short fibers are used in a larger amount. However, the content of LBSP or LDP is preferably from 10%–70% by weight.

As the foregoing pulp, chemical pulp (sulfate pulp and sulfite pulp) even with a small amount of impurities is preferably employed. Bleached pulp enhanced in whiteness is also advantageously used. Into the raw paper pulp, an additive, such as, a sizing agent for example a higher fatty acid or an alkylketene dimer; a white pigment such as calcium carbonate, talc, or titanium oxide; a paper strength increasing agent such as starch, polyacrylamide or polyvinyl alcohol; a fluorescent brightening agent; a moisture holding agent such as polyethylene glycol; a dispersion agent; and a softening agent such as a quaternary ammonium may suitably be added.

The beating degree of the pulp to be used for paper making is preferably from 200–500 ml according to the definition of CSF. As to the fiber length of the pulp after beating, it is preferable that the total of 24 mesh remaining ingredients and 42 mesh remaining ingredients defined by JIS-P-8207 is from 30–70% by weight. The 4 mesh remaining ingredients are preferably not more than 20% by weight. The basis weight of the raw paper is preferably 30–250 g/m², and specifically more preferably 50–200 g/m². The thickness of the raw paper is preferably 40–250 µm. The raw paper may be treated to high smoothness by calendering in the course of or after the paper making. The density of the raw paper (JIS-P-8118) is usually 0.7–1.2 g/m², while the stiffness of the raw paper is preferably 20–200 g according to the condition defined by JIS-P-8143. A surface sizing agent may be coated onto the surface of the raw paper. As the surface sizing agent, the same sizing agent as added to the foregoing raw paper can be used. The pH of the raw paper is preferably 5–9 when the pH is measured by the hot water extraction method defined in JIS-P-8113.

Although the polyethylene covering both surfaces of the raw paper is composed mainly of low density polyethylene (LDPE) and/or high density polyethylene (HDPE), alternatively LLDPE (linear low density polyethylene) or polypropylene may also be used at a partial level. Specifically, the polyethylene layer on the ink absorbing layer side is preferably one containing rutile or anatase type titanium oxide to improve opacity and whiteness of the polyethylene layer such as is widely used for photographic paper. The content of titanium oxide to polyethylene is usually 3–20 weight %, and preferably 4–13%.

Polyethylene laminated paper may be used in this invention, not only for a glossy paper surface but also for a matte or silk surface usually used in photographic paper, which is formed by an embossing treatment during extrusion of polyethylene onto the raw paper.

The utilized amount of polyethylene providing on the front or rear surface of the raw paper is chosen so that the paper exhibits suitable curling after provision of the porous layer and the backing layer. The thickness of the polyethylene layer on the porous layer side is usually 20–40 µm, and that of the polyethylene layer on the backing layer side is usually in the range of 10–30 µm.

Further, the foregoing paper substrate covered with polyethylene preferably exhibits the following properties:

1. Tensile strength: tensile strength in the longitudinal direction is preferably 20–300 N and that in the lateral direction is 10–200 N in terms of strength specified in JIS-P-8113.

2. Tear strength: tear strength in the longitudinal direction is preferably 0.1–20 N and 2–20 N in the lateral direction when determined employing the method specified in JIS-P-8116.

3. Compression elastic modulus ≧98.1 Mpa

4. Surface Bekk smoothness: smoothness of a glossy surface is preferably 20 sec or more under the condition specified in JIS-P-8119, but that of so-called embossed surfaces may be lower value.

5. Surface roughness: surface roughness specified in JIS-B-0601 is preferably at most 10 µm at a maximum height per standard length of 2.5 mm.

6. Opacity: when measured employing the method specified in JIS-P-8138, the opacity is preferably 80% or more, and specifically more preferably 85–98% or more.

7. Whiteness: when measured employing the method specified in JIS-Z-8729, L*, a*, b* are each preferably L*=80–95, a*=−3–+5, and b*=−6–+2.

8. Surface glossiness: 60-degree specular glossiness specified in JIS-Z-8741 is preferably 10–95%.

9. Clark stiffness: a substrate exhibiting a Clark stiffness of 50–300 cm²/100 in the transfer direction of the recording sheet is preferable.

10. Moisture content in core paper: the moisture content of the core paper is usually preferably 2–100 weight % to the core paper, and more preferably 2–6 weight %. Further, plastic substrates usable in this invention may be transparent or opaque, and various resin film may be employed. Polyolefin film (e.g., polyethylene and polypropylene), polyester film (e.g., polyethylene terephthalate and polyethylene naphthalate), polyvinyl chloride and cellulose triacetate may be used, however polyester film is preferably used. Polyester film (hereinafter, referred to simply as polyester) is not specifically limited, but preferred is a polyester exhibiting a film forming capability, which is comprised of a dicarboxylic acid component and a diol component, as primary constituents. Examples of primary constituents of the dicarboxylic acid components include terephthalic acid, isophthalic acid, phthalic acid, 2,6-naphthalenedicarboxylic acid, 2,7-naphthalenedicarboxylic acid, diphenylsulfonedicarboxylic acid, diphenyl ether dicarboxylic acid, diphenylethanedicarboxylic acid, cyclohexanedicarboxylic acid, diphenyldicarboxylic acid, diphenyl thioether dicarboxylic acid, diphenylketonedicarboxylic acid, and phenylindandicarboxylic acid. Further, examples of diol components include ethylene glycol, propylene glycol, tetramethylene glycol, cyclohexenedimethanol, 2,2-bis(4-hydroxyphenyl) propane, 2,2-bis(4-hydroxyethoxyphenyl) propane, bis(4-hydroxyphenyl) sulfone, bisphenolfluorene dihydroxyethyl ether, diethylene glycol, neopentyl glycol, hidroquinone, and cyclohexanediol. Of polyesters comprised of these constituents, from the viewpoint of transparency, mechanical strength, and dimensional stability, preferred as primary constituents is polyester comprised of a dicarboxylic acid component of terephtalic acid or 2,6-naphthalenedicarboxylic acid and a diol component of ethylene glycol or 1,4-cyclohexanedimethanol. Of these polyesters, preferred as primary constituents are polyesters comprised of polyethyleneterephthalate or polyethylenenaphthalate as primary constituents, or copolymerized polyesters comprised of terephthalic acid, 2,6-naphthalenedicarboxylic acid and ethylene glycol, and polyesters comprised of mixtures of more than two kinds of these polyesters.

Next, the preparation method of a recording sheet of the present invention will be described.

An ink jet recording sheet is manufactured employing a procedure in which each component layers including, an ink absorbing layer, are each individually or simultaneously coated on a substrate with a preparation method adequately selected from commonly known coating methods and dried. As a coating method, preferably employed are a roller coating method, a rod or bar coating method, an air knife coating method, a spray coating method, a curtain coating method, a slide bead coating method using hoppers described in U.S. Pat. Nos. 2,761,419 and 2,761,791, or an extrusion coating method.

Viscosity of each coating composition in simultaneous multi-layer coating is preferably in the range of 5–100 mPa·s, and more preferably in the range of 10–50 mPa·s, in the case of a slide bead coating method. While, in the case of a curtain coating method, the viscosity is preferably in the range of 5–1,200 mPa·s, and more preferably in the range of 25–500.

Further, the viscosity of the coating composition at 15° C. is preferably at least 100 mPa·s, more preferably 100–30,000 mPa·s, still more preferably 3,000–30,000 mPa·s, and yet more preferably 10,000–30,000 mPa·s.

EXAMPLE

The present invention will now be exemplified below with examples, but it is not limited to these examples.
Preparation of Ink Jet Recording Medium
Recording media 1 through 4 were prepared based on the following methods.
Preparation of Recording Medium 1
Preparation of Substrate 1

Low density polyethylene of 0.92 mass density was coated at a thickness of 35 μm using an extrusion coating method onto the back side of photographic raw paper of 6% moisture content and 200 g/m² weight. Then, low density polyethylene of 0.92 mass density containing anatase type titanium oxide of 5.5% was coated at a thickness of 40 μm with an extrusion coating method onto the surface side, to obtain Substrate 1, covered on both sides with polyethylene. After the front surface side of it was subjected to a corona discharge treatment, a subbing layer was provided to be 0.03 g/m². The backside was also subjected to a corona discharge treatment, and provided with a latex layer at 0.12 g/m².
Preparation of Coating Composition

| | |
|---|---|
| Lime-treated gelatin (KV-3000, produced by Konica Corp.) | 50 weight parts |
| Polyvinyl alcohol (PVA235, produced by Kuraray Co., Ltd.) | 50 weight parts |
| Matting agent (fine organic particles, MR-13G, produced by Soken Chemicals Co., Ltd.) | 0.5 weight parts |
| Surface active agent (Megafax F-120) | 0.3 weight parts |

All of the above additives were sequentially mixed, and diluted with water to bring the solid content of the coating composition to 8 weight %, resulting in Coating Composition-1.
Coating After foregoing Coating Composition-1 as an ink absorbing layer was applied with a bar coating method onto Substrate 1, prepared as above to have a film weight of 8 g/m² after drying, and cooled down to about 7° C., then dried by 20–65° C. airflow, to obtain swelling type Recording Medium 1.
Preparation of Recording Medium 1
Preparation of two dispersion Solutions
Preparation of Silica Dispersion Solution-1

160 Kg of a gas phase method silica having an average particle size of primary particles of about 12 nm (produced by Tokuyama Corporation: Reorosil QS-20) was subjected to suction dispersion into water (containing 10 L of ethanol) which pH was adjusted to 2.5 with nitric acid, using Jet-stream inductor Mixer TDS manufactured by Mitamura Riken Co., Ltd., after which the total volume was raised to 600 L with water, to obtain Silica Dispersion Solution-1.
Preparation of Silica Dispersion Solution-2

The foregoing 60.0 L of Silica Dispersion Solution-1 was added to 15 L of an aqueous solution (pH=2.3) containing cationic polymer (HP-1) of 2.12 Kg, 2.2 L of ethanol and 1.1 L of n-propanol while stirring, and then 8.0 L of an aqueous solution containing 320 g of boric acid and 190 g of borax was added, and further added were 200 ml of an aqueous solution containing 2 g of anti-foaming agent SN381, produced by San Nopuco Ltd.

The resulting solution was dispersed using a High Pressure Homogenizer manufactured by Sanwa Industries Co., Ltd., and the total volume was raised to 85 L using water, to obtain Silica Dispersion Solution-2.

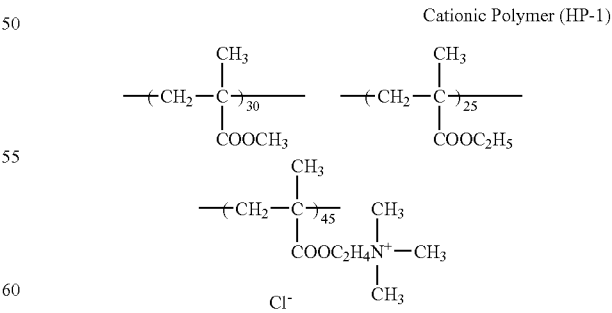

Cationic Polymer (HP-1)

Preparation of Coating Composition
Preparation of Coating Composition-2

While 650 ml of the above Silica Dispersion Solution-2 was stirring at 40° C., the following additives were sequentially added to obtain Coating Composition-2.

| | |
|---|---|
| 10% aqueous solution of polyvinyl alcohol (PVA203: produced by Kuraray Co., Ltd.) | 6 ml |
| 5% aqueous solution of polyvinyl alcohol (PVA235: produced by Kuraray Co., Ltd.) | 260 ml |
| 5% aqueous solution of polyvinyl alcohol (PVA245: produced by Kuraray Co., Ltd.) | 95 ml |
| 30% aqueous solution of a surface active agent (S-1) | 4 ml |
| 10% aqueous solution of an anionic fluorescent brightening agent (UVITEX NFW LIQUID9: produced by Ciba Specialty Chemicals) | 10 ml |
| Water to make | 1,000 ml |
| pH of the coating composition was about 4.5. | |

Surface Active Agent (S-1)

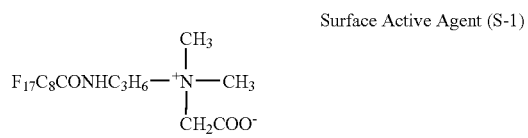

Coating

Coating Composition-2 above was coated onto foregoing prepared Substrate 1 to a wet thickness of 140 μm, and cooled down to about 7° C., after which it was dried by 20–65° C. airflow, to obtain porous type Recording Medium 2.

Preparation of Recording Medium 3

Recording Medium 3 was prepared in the same manner as foregoing Recording Medium 2 except that Compound 1 [bis(sulfoethyl)hydroxylaminedisodium] as an antioxidizing agent was added to Coating Composition-2 so that the coated amount of Compound 1 became 0.1 g/m$^2$.

Preparation of Recording Medium 4

Recording Medium 4 was prepared in the same manner as foregoing Recording Medium 2 except that Compound 2 (2,5-di-t-pentylhidroquinonedioctyl ether) as an antioxidizing agent was added to Coating Composition-2 so that the coated amount of Compound 2 became 0.3 g/m$^2$.

Compound 2 was dissolved into ethyl acetate and diisodecylphthalate, and then a gelatin solution and saponin as a surface active agent were added. The mixture was dispersed using an ultra-sonic homogenizer to prepare a dispersion solution, which was added to the coating composition.

Preparation of Dye Ink

Dye inks 1 through 12 were prepared using the following method.

Preparation of Dye Ink 1

| | |
|---|---|
| C. I. Direct Blue 199 | 3 weight % |
| Urethane type Latex 1 (MFT = 5° C., at average particle Size = 110 nm) | 2 weight % |
| Diethylene glycol | 25 weight % |
| Sodium dioctylsulfosuccinale | 0.01 weight % |
| Water to make | 100 weight % |

Thus, Dye Ink 1 was prepared.

Preparation of Dye Ink 2

| | |
|---|---|
| C. I. Direct Blue 199 | 3 weight % |
| Urethane type Latex 2 (MFT = 5° C., at average particle Size = 110 nm, containing exemplified compound UV-1-3 in the amount of 50 weight %) | 2 weight % |
| Diethylene glycol | 25 weight % |
| Sodium dioctylsulfosuccinale | 0.01 weight % |
| Water to make | 100 weight % |

Thus, Dye Ink 2 was prepared.

Preparation of Dye Ink 3

| | |
|---|---|
| C. I. Direct Blue 199 | 3 weight % |
| Urethane type Latex 3 (MFT = 5° C., at average particle Size = 110 nm, containing exemplified compound UV-1-6 in the amount of 40 weight %) | 2 weight % |
| Diethylene glycol | 25 weight % |
| Sodium dioctylsulfosuccinale | 0.01 weight % |
| Water to make | 100 weight % |

Thus, Dye Ink 3 was prepared.

Preparation of Dye Ink 4

| | |
|---|---|
| C. I. Direct Blue 199 | 3 weight % |
| Urethane type Latex 4 (MFT = 5° C., at average particle Size = 110 nm, containing exemplified compound UV-2-17 in the amount of 55 weight %) | 2 weight % |
| Diethylene glycol | 25 weight % |
| Sodium dioctylsulfosuccinale | 0.01 weight % |
| Water to make | 100 weight % |

Thus, Dye Ink 4 was prepared.

Preparation of Dye Inks 5 through 12

Dye Inks 5 through 12 were prepared in the same manner as above in the preparation of Dye Ink 2 except that Latex 2 was replaced with latexes having different MFT or average particle sizes or by changing the added amount of latexes as described in Table 1.

Preparation of Dye Ink 13

| | |
|---|---|
| C. I. Direct Blue 199 | 3 weight % |
| Urethane type Latex 1 (MFT = 5° C., at average particle Size = 110 nm) | 2 weight % |
| Thioether type anti-oxiding agent (*) | 1 weight % |
| Diethylene glycol | 25 weight % |
| Sodium dioctylsulfosuccinale | 0.01 weight % |
| Water to make | 100 weight % |

Thus, Dye Ink 13 was prepared.

(*)HO—$C_2H_4$S—$C_2H_4$S—$C_2H_4$OH

Ink Jet Image Formation

A MJ800C printer manufactured by Seiko Epson Corporation was employed as a printer, and Dye Inks 1 through 12 prepared as above were each loaded into the ink cartridge provided for the printer. Thus, solid Printed Images 1 through 17 were out-putted in the combinations of Inks and Recording Mediums described in Table 1 at an ink ejected volume of 10 ml/m$^2$.

Measurement and Evaluation of Ink Jet Images

The cyan images formed above were subjected to measurement and evaluation based on the following methods.

Evaluation of Ink Absorbability

The surfaces of the solid printed images as printed above were placed into contact with blank sheets of paper after printing (about 10 seconds later), and ink transcription to the paper was visually observed to evaluate ink absorbability using the following criteria.

5: No ink was transferred to the paper.

4: Slight ink transfer to the paper was observed.

3: Some ink transfer to the paper was observed, but causing no problem in practice.

2: Obvious ink transfer to the paper was observed, and causing practical problems.

1: Significant ink transfer to the paper was observed, and resulting in problems of commercial viability.

Evaluation of Oxidizing Gas Resistance: Discoloration Property

Solid printed images as printed with the foregoing method were each pasted into the office side of a window under conditions of exposure to ambient air but not to direct sunlight for 6 months. The reflection densities of prints of before and after exposure were measured in the single color red using an optical densitometer (X-Rite 938 manufactured by X-Rite Inc.) to determine the density residual ratio based on the following calculation, whereby evaluation of oxidizing gas resistance was conducted based on the following criteria.

Density residual ratio=(Density after 6 months storage/Density before storage)×100 (%)

5: density residual ratio was 95% or more
4: density residual ratio was from 85% or more to less than 95%
3: density residual ratio was from 75% or more to less than 85%
2: density residual ratio was from 65% or more to less than 75%
1: density residual ratio was less than 65%

Evaluation of Light Stability

Reflection density residual ratios [(reflection density after Xenon Fade-o-Meter irradiation/reflection density before Xenon Fade-o-Meter irradiation)×100 (%)] of cyan solid images were measured using Xenon Fade-o-Meter after irradiation of 70,000 Lx for 240 hrs, and then light. stability of each image was evaluated based on the following criteria.

5: reflection density residual ratio was 95% or more
4: reflection density residual ratio was from 90% or more to less than 95%
3: reflection density residual ratio was from 85% or more to less than 90%
2: reflection density residual ratio was from 80% or more to less than 85%
1: reflection density residual ratio was less than 80%

Film Forming Capability After Printing

The surface of the image printed with the foregoing method was visually observed, and evaluation of film forming capability was conducted based on the following criteria.

A: in the printed area, a uniform gas barrier layer was formed
B: in the printed area, a fairly satisfactory gas barrier layer was formed
C: in parts of the printed area, a gas barrier layer was not formed, but still at a practically acceptable level
D: in the printed area, a negligible gas barrier layer was observed The obtained results in the foregoing evaluation are shown in Table 1 below.

TABLE 1

| Printed image No. | Recording medium No. | Recording medium Type | Anti-oxidizing agent | Dye ink No. | Latex in dye ink Ultraviolet absorption monomer | MFT (° C.) | Average particle size (nm) | Content (weight %) | Evaluation result *3 | *4 | *5 | *6 | Remarks |
|---|---|---|---|---|---|---|---|---|---|---|---|---|---|
| 1 | 1 | *1 | — | 1 | — | 5 | 110 | 2.0 | 1 | 4 | 2 | B | Comp. |
| 2 | 2 | *2 | — | 1 | — | 5 | 110 | 2.0 | 5 | 4 | 2 | B | Comp. |
| 3 | 2 | *2 | — | 2 | UV-1-3 | 5 | 110 | 2.0 | 5 | 5 | 4 | A | Inv. |
| 4 | 2 | *2 | — | 3 | UV-1-6 | 5 | 110 | 2.0 | 5 | 5 | 4 | A | Inv. |
| 5 | 2 | *2 | — | 4 | UV-2-17 | 5 | 110 | 2.0 | 5 | 5 | 4 | A | Inv. |
| 6 | 2 | *2 | — | 5 | UV-1-3 | 40 | 110 | 2.0 | 5 | 4 | 4 | A | Inv. |
| 7 | 2 | *2 | — | 6 | UV-1-3 | 78 | 110 | 2.0 | 5 | 3 | 4 | A | Inv. |
| 8 | 2 | *2 | — | 7 | UV-1-3 | 5 | 165 | 2.0 | 5 | 5 | 4 | B | Inv. |
| 9 | 2 | *2 | — | 8 | UV-1-3 | 5 | 255 | 2.0 | 5 | 5 | 4 | C | Inv. |
| 10 | 2 | *2 | — | 9 | UV-1-3 | 5 | 110 | 0.5 | 5 | 3 | 3 | C | Inv. |
| 11 | 2 | *2 | — | 10 | UV-1-3 | 5 | 110 | 1.0 | 5 | 4 | 4 | B | Inv. |
| 12 | 2 | *2 | — | 11 | UV-1-3 | 5 | 110 | 10.0 | 5 | 5 | 4 | A | Inv. |
| 13 | 2 | *2 | — | 12 | UV-1-3 | 5 | 110 | 20.0 | 4 | 5 | 4 | A | Inv. |
| 14 | 3 | *2 | Compound 1 | 2 | UV-1-3 | 5 | 110 | 2.0 | 5 | 5 | 5 | A | Inv. |
| 15 | 4 | *2 | Compound 2 | 2 | UV-1-3 | 5 | 110 | 2.0 | 5 | 5 | 5 | A | Inv. |
| 16 | 2 | *2 | — | 13 | UV-1-3 | 5 | 110 | 2.0 | 5 | 5 | 5 | A | Inv. |
| 17 | 3 | *2 | Compound 1 | 13 | UV-1-3 | 5 | 110 | 2.0 | 5 | 5 | 5 | A | Inv. |

*1 Swelling type
*2 Porous type
*3 Ink absorbability
*4 Oxidizing gas resistance
*5 Light stability
*6 Film forming capability
Comp. Comparative Example
Inv. Present Invention As is apparent from Table 1, it was proved that the images printed and formed using the dye ink containing latex having an ultraviolet absorption capability on the recording medium having at least one layer of an ink absorbing layer featuring a porous structure, which are the-composition of the present invention, were superior in ink absorbability, and exhibited excellent oxidizing gas resistance and light stability, compared to the comparative examples. Further, it is also confirmed that the above effects were enhanced when that the MFT (minimum film forming temperature) of the latex was 0-40° C., the average particle size of the latex was at most 150 nm, the content of the latex was 1.0-10 weight % to the total weight of the dye ink, and an anti-fading agent was contained in the recording medium.

According to the present invention, it is possible to provide an ink jet recording method which is superior in ink absorbability and exhibits favorable harmful gas resistance (oxidizing gas resistance) and light stability.

What is claimed is:

1. An ink jet recording method comprising a step of:

jetting a dye ink onto a surface of a recording medium, wherein said dye ink comprises a latex capable of absorbing ultraviolet light, and said recording medium comprises a substrate having thereon at least one ink absorbing layer, the outermost ink absorbing layer being a porous layer.

2. The ink jet recording method of claim 1, wherein said latex has a group of a benzotriazole derivative or a benzophenone derivative.

3. The ink jet recording method of claim 2, wherein said group of a benzotriazole derivative is represented by Formula (1):

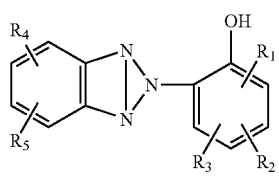

Formula (1)

wherein $R_1$, $R_2$, $R_3$, $R_4$ and $R_5$, which may be the same or different, each represents a halogen atom, a nitro group, a hydroxyl group, an alkyl group, an alkenyl group, an aryl group, an alkoxyl group, an acyloxy group, an aryloxy group, an alkylthio group, an arylthio group, a mono- or dialkylamino group, an acylamino group, or a 5- or 6-membered heterocyclic group, and $R_4$ and $R_5$ may combine to form a 5- or 6-membered carbocycle.

4. The ink jet recording method of claim 2, wherein said group of a benzophenone derivative is represented by Formula (2):

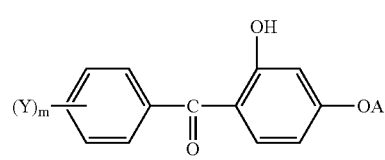

Formula (2)

wherein Y represents a halogen atom, an alkyl group, an alkenyl group, an alkoxyl group, or a phenyl group, provided that said alkyl group, said alkenyl group and said phenyl group may have a substituent; A represents a hydrogen atom, an alkyl group, an alkenyl group, a phenyl group, a cycloalkyl group, an alkylcarbonyl group, an alkylsulfonyl group, or —CO(NH)n–1-D; D represents an alkyl group, an alkenyl group, or a phenyl group which may have a substituent; m and n each represents 1 or 2.

5. The ink jet recording method of claim 1, wherein MFT (minimum film forming temperature) of said latex capable of absorbing ultraviolet light is 0–40° C.

6. The ink jet recording method of any of claim 1, wherein the average grain size of said latex capable of absorbing ultraviolet light is at most 150 nm.

7. The ink jet recording method of claim 1, wherein a content ratio of said latex is 1.0–10 weight % of the total weight of the dye ink.

8. The ink jet recording method of claim 1, wherein said dye ink contains an anti-fading agent.

9. The ink jet recording method of claim 1, wherein said substrate of the recording medium is a nonabsorbent material.

10. The ink jet recording method of claim 1, wherein an ink absorbing layer featuring a porous structure contains fine silica particles.

11. The ink jet recording method of claim 1, wherein an ink absorbing layer featuring a porous structure contains a cationic polymer.

12. The ink jet recording method of claim 1, wherein an ink absorbing layer featuring a porous structure contains polyvinyl alcohol.

13. The ink jet recording method of claim 1, wherein an ink absorbing layer featuring a porous structure contains an anti-fading agent.

* * * * *